United States Patent [19]

Hardin, Jr.

[11] 4,299,662
[45] Nov. 10, 1981

[54] CONNECTING APPARATUS FOR LIMITED ROTARY OR RECTILINEAR MOTION

[75] Inventor: Roy T. Hardin, Jr., Greensburg, Pa.

[73] Assignee: The United States of America as represented by the United States Department of Energy, Washington, D.C.

[21] Appl. No.: 28,136

[22] Filed: Apr. 9, 1979

Related U.S. Application Data

[63] Continuation of Ser. No. 800,257, May 25, 1977, abandoned.

[51] Int. Cl.³ .............................................. G21C 19/20
[52] U.S. Cl. ..................................................... 376/260
[58] Field of Search ..................................... 176/30, 87

[56] References Cited

U.S. PATENT DOCUMENTS

| | | | |
|---|---|---|---|
| 3,537,059 | 10/1970 | Howe | 339/8 R |
| 3,551,612 | 12/1970 | Guentner | 191/12 C |
| 3,567,576 | 2/1971 | Isaac | 176/30 |
| 3,583,892 | 6/1971 | Isaac | 176/30 |
| 3,836,429 | 9/1974 | Frisch et al. | 176/30 X |
| 3,836,430 | 9/1974 | Frisch et al. | 176/30 X |

FOREIGN PATENT DOCUMENTS 1432272  4/1976  United Kingdom.

Primary Examiner—Peter A. Nelson
Attorney, Agent, or Firm—Edward L. Levine; Z. L. Dermer

[57] ABSTRACT

Apparatus for providing connection between two members movable in a horizontal plane with respect to each other in a rotary or linear fashion. The apparatus includes a set of horizontal shelves affixed to each of the two members, vertically aligned across a selected gap. A number of cables or hoses, for electrical, hydraulic or pneumatic connection are arranged on the aligned shelves in a U-shaped loop, connected through their extremities to the two members, so that through a sliding motion portions of the cable are transferred from one shelf to the other, across the gap, upon relative motion of the members. The apparatus is particularly adaptable to the rotating plugs of the reactor vessel head of a nuclear reactor.

5 Claims, 10 Drawing Figures

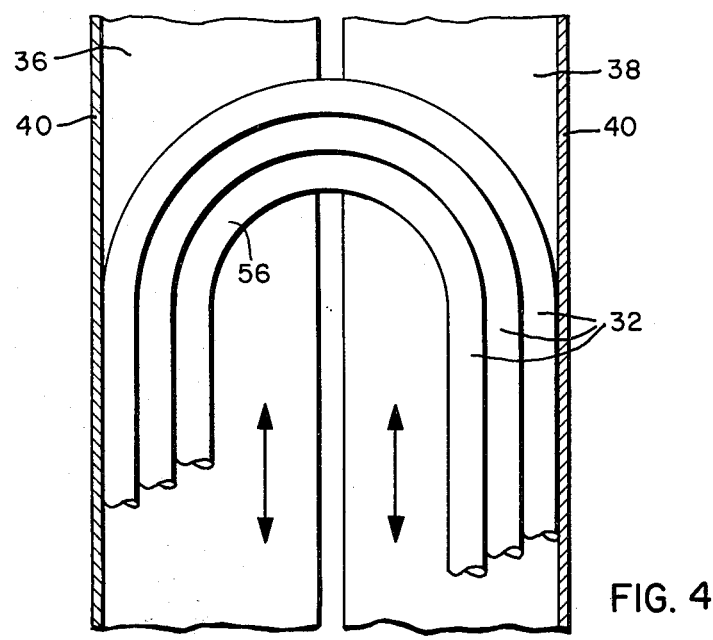
FIG. 4
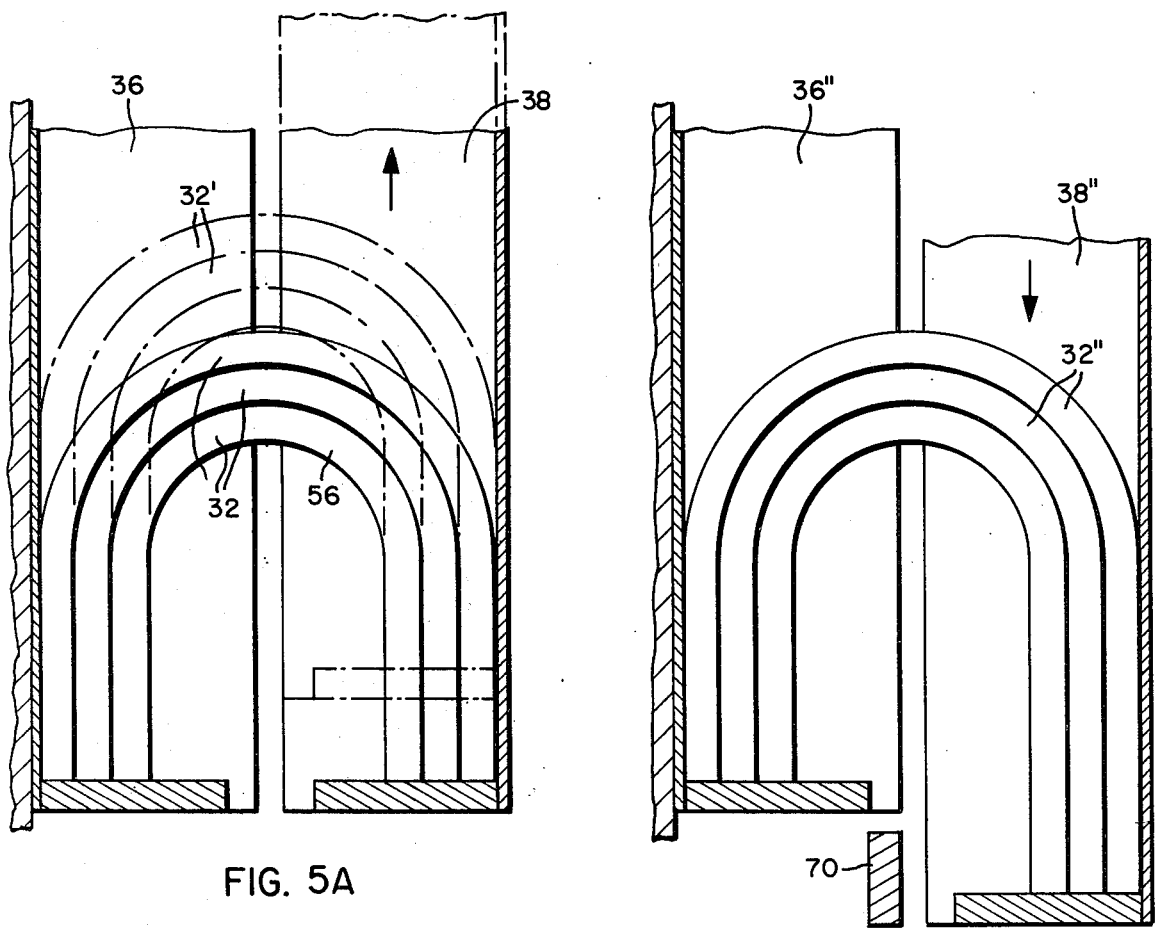
FIG. 5A
FIG. 5B

CONNECTING APPARATUS FOR LIMITED ROTARY OR RECTILINEAR MOTION

The invention described herein was made in the course of, or under, a contract with the United States Energy Research and Development Administration (ERDA), the successor in interest to the United States Atomic Energy Commission (AEC).

This is a continuation of application Ser. No. 800,257, filed May 25, 1977 abandoned.

CROSS-REFERENCE TO RELATED APPLICATION

Reference is made to U.S. patent application filed concurrently herewith in the name of R. T. Hardin et al, entitled "Connecting Apparatus For Limited Rotary Or Rectilinear Motion (II)", assigned to the Westinghouse Electric Corporation, and hereby incorporated by reference. That application discloses apparatus providing an alternative to that disclosed herein, particularly where lateral spatial limitations are more severe.

BACKGROUND OF THE INVENTION

1. Field of the Invention

This invention relates to apparatus for providing connection between two members having relative motion in a horizontal plane, particularly adaptable to the rotating plugs of the reactor vessel head of a nuclear reactor.

2. Description of the Prior Art

Certain types of nuclear reactors require that refueling and maintenance operations be performed remotely, that is, without removal of the reactor vessel head. A plurality of rotating plugs have been provided for these operations which, through controlled rotation, allow remote access to the core locations. It is important, however, that electrical and other connections, such as gas services, be maintained to the various plugs and reactor components during relative motion. This requirement is complicated by the large number of connections and further by spatial limitations in the reactor head vicinity.

In the prior art, reactor designers faced with these limitations have utilized apparatus which moves the cables in a manner similar to a split tank-type track having a fixed end and a movable end. The cables are contained within supporting plates or carriers, having openings bored to the size of the cable diameters, which are positioned between a plurality of chain links. The links are assembled to a close tolerance, allowing bending of the apparatus as necessary during motion. Although such apparatus properly perform the cable connection function, they are not without deficiencies. The tracks require a significant amount of space, which can affect the design of the connected components or limit the number of cables utilized. Further, the track system requires a large number of individual interlocking pin joints and sliding metal surfaces, manufactured and assembled to close tolerances. The large number of moving parts adds a potential for failure and a significant cost to the reactor systems.

In other applications where it is desirable to provide electrical connections between movable components, systems have been proposed which have similar deficiencies, particularly in the complexity and relatively large number of components required. Two such applications are described in U.S. Pat. No. 3,551,612 in the name of R. L. Guentner, and U.S. Pat. No. 3,537,059 in the name of E. W. Howe.

It therefore is desirable to provide apparatus which allows continuous connection of the large number of cables or hoses during rotation and refueling operations, which also minimizes interference with personnel and other reactor equipment, and which alleviates the deficiencies of the prior art.

SUMMARY OF THE INVENTION

This invention discloses apparatus for providing connection between two members movable with respect to each other in a horizontal plane in a limited rectilinear or rotary fashion. The apparatus is particularly adaptable to the rotating plugs of a nuclear reactor, and offers high reliability as a result of the relatively few moving components.

In a preferred embodiment the invention includes a number of horizontal plates or surfaces, spaced one above another, each having an upwardly extending restraint. This stack of shelves is affixed to one of the movable members, and a similar stack is affixed to the other member so that the horizontal plates are aligned at common elevations. The mating stacks are laterally spaced so as to provide a gap therebetween.

A number of flexible connecting conduits, hoses or cables are positioned upon the mating surfaces so that a portion of each cable is held by gravity upon each of the two aligned shelves, between their respective upward restraints. Each cable is oriented to have a singular U-shaped loop which passes across the gap between aligned surfaces. The cables are substantially stationary at opposite portions with respect to each of the respective members, either terminating at a junction or affixed to the surfaces.

Upon relative motion of the members the cables slide from one surface to the other, the U-shaped loop sliding with respect to both members. Where one member is fixed and the other moves, the moving horizontal surface acquires additional cable as motion is in the direction which appears to pull cable from the stationary shelf. The stationary surface acquires cable as the moving shelf rotates or moves rectilinearly in the opposite direction.

The apparatus can advantageously include a number of cables at a given elevation, each cable being positioned within the horizontal area enclosed by an adjacent outer cable. Preferably the conduits have a circular cross-section and similar outside diameters. The vertical spacing between horizontal shelves is then slightly larger than this diameter, and the lateral gap between shelves is smaller than the diameter to alleviate cable binding upon motion. A vertical guard can also be utilized in those areas where motion positions a portion of the cables beyond mating shelves. The guard is spaced from the shelves with a similar lateral gap to alleviate the potential of cables falling from the shelves as a result of a large lateral accidental loading such as a seismic occurrence.

BRIEF DESCRIPTION OF THE DRAWINGS

The advantages, nature and additional features of this invention will become more apparent from the following description, taken in connection with the accompanying drawings, in which:

FIG. 4 is a plan view of an embodiment of this invention;

FIGS. 5A and 5B are plan views, in section, showing relative motion of some of the components of another embodiment;

DESCRIPTION OF THE PREFERRED EMBODIMENTS

Figure 1:
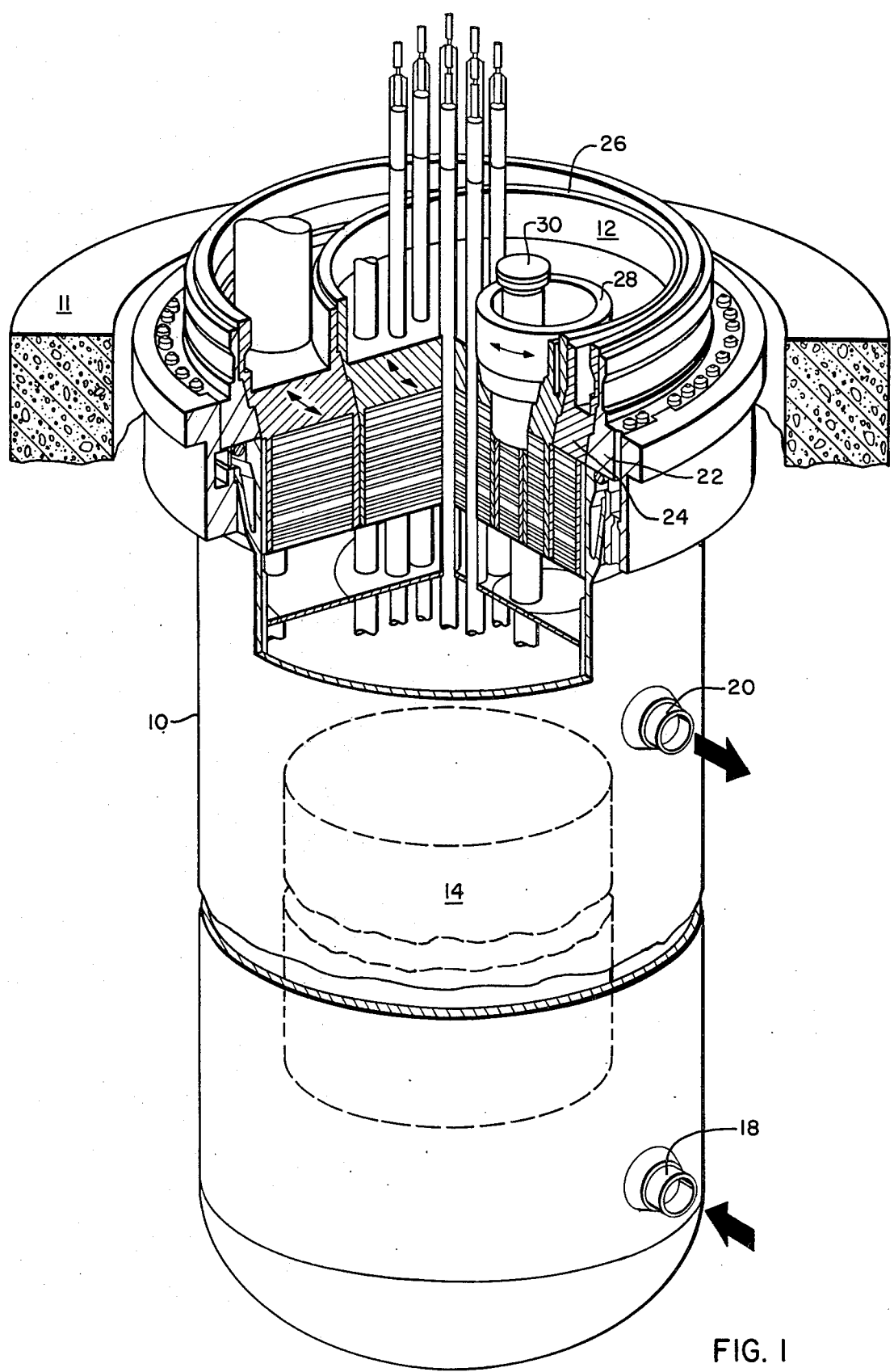
FIG. 1 is a perspective view, partially in section, of a nuclear reactor.

Referring now to FIG. 1 there is shown portions of a nuclear reactor including a reactor vessel 10 affixed to a vessel head assembly 12. The vessel is supported within a stationary enclosure such as a concrete support 11. A nuclear core 14 comprised of a plurality of vertically oriented fuel assemblies is positioned within the vessel so that a coolant fluid, such as liquid sodium or gaseous helium, can be circulated through the core 14. The fluid enters the vessel 10 through a plurality of inlet nozzles 18, flows upwardly through the core absorbing heat energy, and is discharged through outlet nozzles 20 to heat transfer and other apparatus typically for the ultimate purpose of electrical power generation.

The vessel head 12 includes a stationary outer ring 22, a large rotating plug 24, an intermediate rotating plug 26, and a small rotating plug 28. The stationary outer ring is concentrically arranged about the large plug 24, while the intermediate 26 and small 28 plugs are arranged off-center. For refueling or maintenance, the plugs are rotated in a preselected sequence which positions an invessel transfer mechanism port 30 directly above each core assembly location. During reactor power generation, and also during refueling, hundreds of electrical and other connections must be maintained between equipment external to the vessel 10, and within the vessel and atop the rotating plugs. The connections are made through a plurality of conduits such as cables 32 which transfer power, fluids, and electrical signals for reactor control and instrumentation. Typical of the services supplied merely through the transfer machine port 30 are those for heaters, motor drives, jacks and blowers, limit switch connectors, compressed gases, thermocouples and ground wires. Other fluid services can also be supplied.

Figure 2:
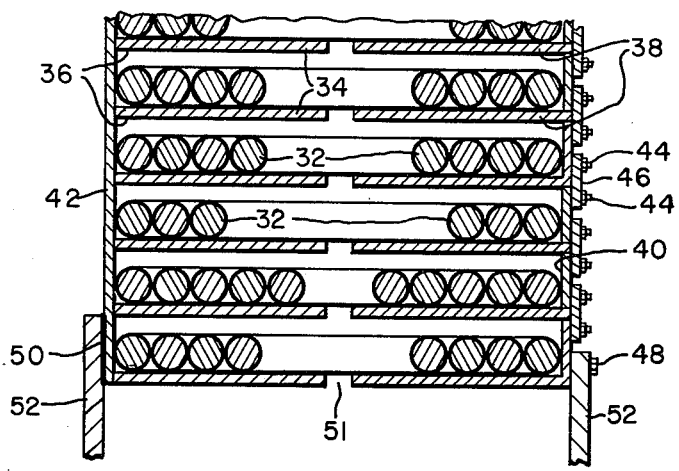
FIG. 2 is an elevation view, in section, of one embodiment of the cable connection apparatus of this invention.

In accordance with this invention the cables or hoses are primarily supported by a series of stacked horizontal shelves or compartments 34, shown best in FIG. 2. It is to be understood that the following description of invention embodiments as applied to a nuclear reactor is merely exemplary, and that the invention can advantageously be used in many other applications involving limited reciprocating rotary ro rectilinear motion between members. The Figure shows one structural arrangement for the compartments 34, which include a plurality of first horizontal surfaces 36 and a plurality of second horizontal surfaces 38. Substantially all of the surfaces 36, 38 include an upwardly extending restraint 40, which can together form an integral side plate 42 along the height of the stack, as shown on the left of FIG. 2. Manufacturing and maintenance considerations will dictate whether a singular side plate 42 or a plurality of individual surfaces 36, 38 and restraints are utilized. For example, if the ability to remove layers of the stack is preferred, the surfaces can be removably affixed by means such as bolts 44, and a fixture plate 46. Each stack of compartments 34 is also provided with means for affixing the stack to its supporting members, such as the stationary outer ring 22 and the large rotating plug 24, which means can include bolts 48 or welds 50, and can further include a riser plate 52. As the elevation of the relatively movable members 22, 24 is fixed, each stack of surfaces is affixed to the respective member so as to vertically align the surfaces 36, 38. The stacks are also affixed to the members with a preselected gap or space 51 between aligned surfaces. The gap 51 allows free relative motion without interference.

Figure 3:
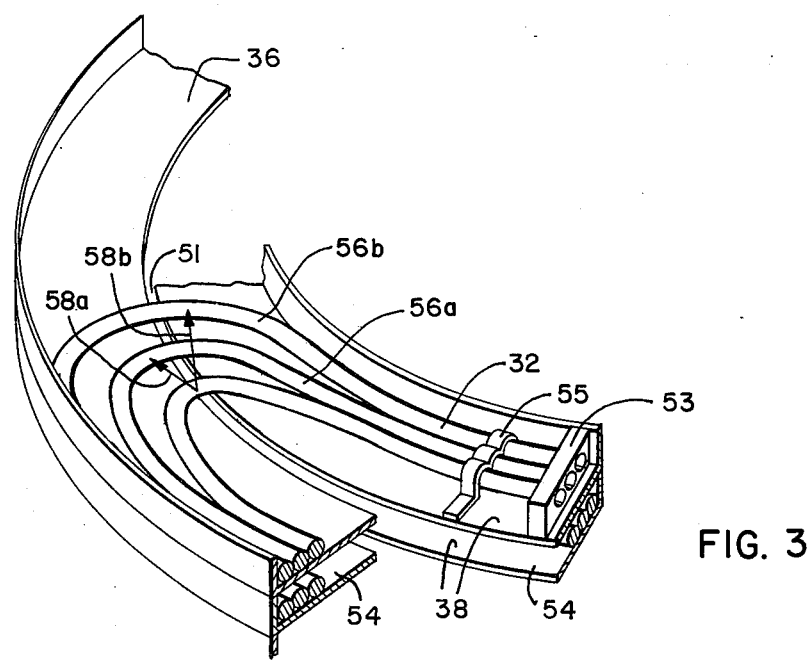
FIG. 3 is a perspective view of a portion of the apparatus of FIG. 2.

The horizontal surface 36, 38 can have various shapes, dependent upon the type of motion and can be integral with the restraints 40. As shown in FIG. 3, where rotary motion is required, the surfaces are arcuate or circular, although they are preferably rectangular for relative rectilinear motion, as shown in FIG. 4. The surfaces 36, 38 should be substantially flat and comprised of a material offering minimum resistance to sliding of the cables 32. They may be slightly slanted from the horizontal to encourage seating against the restraints 40, although such is not required.

The cables are positioned upon vertically aligned surfaces 36, 38, between the respective restraints 40, so that each forms a singular generally U-shaped loop 56 in the horizontal plane. A number of cables 32 can be supported upon one aligned pair of surfaces 36, 38. The cables are then positioned adjacent one another such that the loop 56 of one cable (56a) is contained within the horizontal area enclosed by the loop (56b) of its adjacent outer cable. This necessarily requires that the bend radius 58a be smaller than the bend radius 58b where rotary motion is involved. The term radius is here used for explanation, although the loop 56 will not be perfectly arcuate. The number of cables at any given elevation is therefore determined by the minimum allowable bend radius and the span of the surfaces 36, 38 between respective restraints 40. Although cables 32 of varying size and shape can be utilized, in the preferred nuclear reactor arrangement all of the cables are of circular cross-section, with a substantially common outside diameter of one inch $\pm \frac{1}{8}$ of an inch. The width of the gap 51 is preferably smaller than the cable diameter to alleviate binding upon motion. Also, the vertical spacing between consecutive horizontal surfaces 36, 38 is less than two cable diameters to alleviate crossing of the cables upon rotation. A spacing of approximately $1\frac{1}{2}$ times the cable diameter is preferred.

The cables 32 can extend from one movable member to the other, or terminate in quick-disconnect electrical or fluid apparatus 53 as well known in the art. Portions of the cables, such as their ends, are, however, substantially fixed or stationary relative to the respective movable members. This can also be accomplished by means of clips 55, affixed to the surfaces 36, 38. The required total length of the cables will, of course be determined by the amount of rotary or rectilinear travel and the size of the relatively movable components.

Figure 6:
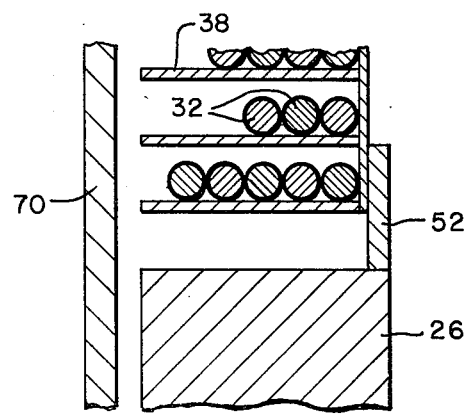
FIG. 6 is another elevation view of an embodiment of the invention.

The operation of the connecting apparatus is simple, having no moving linkages or joints. In addition to the movable members, only the affixed horizontal surfaces and the cables themselves are in motion. Rectilinear movement is illustrated in FIGS. 5A and 5B. The cables 32 and surfaces 36, 38 are initially positioned as shown by the solid lines in FIG. 5A. In this example, the surface 36 is fixed, while surface 38 is moved in the direction shown by the arrow to, for example, the position shown by the broken lines. During this motion the cables move to the position identified 32'. As shown, a portion of the cables is transferred from surface 38 to surface 36, as the loops 56 and cables slide. FIG. 5B shows the position of the components with movement of surface 38" in the opposite direction. A portion of the cables 32" has shifted to surface 38". A portion of the cables on surface 38" now extends beyond the aligned surface 36". In the event of large loadings, such as a seismic occurrence, the cables could shift beyond the supporting surface 38". A vertically oriented guard 70 can maintain the cables on their mating surfaces. The guard 70 is additionally shown in FIG. 6, laterally spaced from the horizontal surfaces 38 less than one cable diameter.

Figure 7A:
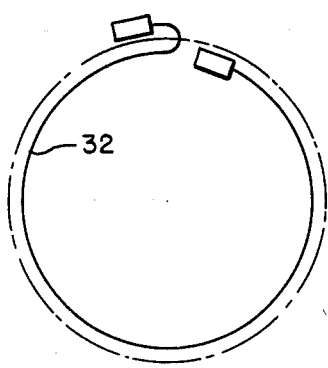
FIGS. 7A and 7B are plan view schematics illustrating relative motion of the components of an embodiment of the invention.
Figure 7B:
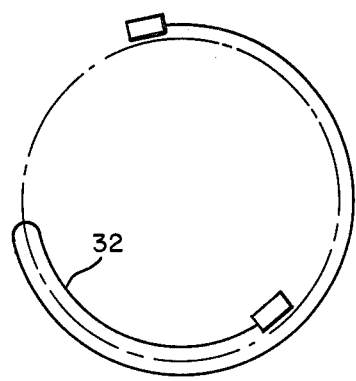

Rotational motion is similar, with a portion of the cables sliding from one aligned surface to the other. Reciprocating rotary motion is illustrated in FIGS. 7A and 7B. Rotation both clockwise and counterclockwise provides cable positioning throughout an arc greater than 360°. Although the surfaces 36, 38 can be circular, they need only be arc-shaped segments.

Figure 8:
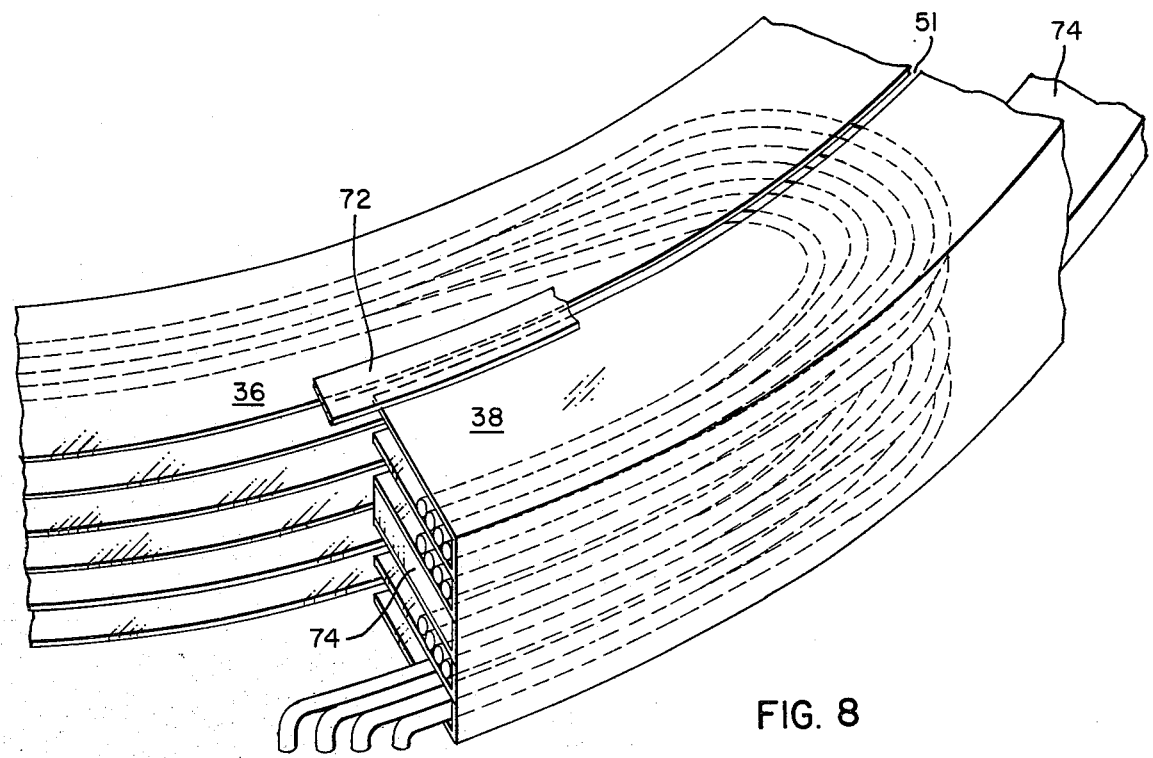
FIG. 8 is another perspective view of some additional embodiments of the invention.

It will be apparent that many additional features can be incorporated in the connection apparatus, particularly for nuclear application. For example, FIG. 8 shows a seal 72 which can be affixed to surface 36 and extend across surface 38 so as to slide across surface 38 during rotation. The seal 72 insures that objects cannot fall into the gap 51 and damage the cables or other components. Also, for additional electrical separation or hazard protection, a plate 74 can be included between consecutive surfaces. Several plates 74 could be utilized for separation of power cables, control cables, instrument cables, and pneumatic or hydraulic hoses. Also, both members, that affixed to surfaces 36 and that affixed to surfaces 38 can move, if desired.

It will also be apparent that the connection apparatus provides reliable operation and ease of maintenance or cable replacement. The cables on any surface can be replaced merely by disconnecting the extremities, removing the old cables, and reinserting new ones. A major benefit of the apparatus is its lack of reliance upon complex linkage or support elements. The cables are supported, and translated, merely by gravity and the frictional forces between the cable and the horizontal surface.

Many additional modifications are possible in view of the above teachings. It therefore is to be understood that within the scope of the appended claims, the invention may be practiced other than as specifically described.

I claim:

1. A nuclear reactor including substantially stationary members, a horizontally rotatable vessel head plug mounted above a nuclear core, and apparatus for providing connection between one of said members and said plug comprising:
   a. a first plurality of affixed horizontal surfaces spaced one above another, each having an upwardly extending restraint;
   b. a second plurality of affixed horizontal surfaces spaced one above another, each having an upwardly extending restraint;
   c. structure for affixing said first surfaces to said one member and said second surfaces to said rotatable plug such that said first surfaces are vertically aligned with said second surfaces and are spaced therefrom a preselected distance;
   d. a first plurality of flexible cables, each said cable being stationary at one portion with respect to said one member and stationary at another portion with respect to said rotatable plug and positioned partially upon one of said first surfaces and partially upon the respective aligned second surface, between their respective restraints, so as to form a generally U-shaped loop in a first horizontal plane which slidingly moves with respect to both of said surfaces upon rotation of said plug; and
   e. a second plurality of flexible cables, each said cable of said second plurality being stationary at one portion with respect to said one member and stationary at another portion with respect to said rotatable plug and positioned partially upon another one of said first surfaces and partially upon a respective aligned another second surface, between their respective restraints, so as to form a generally U-shaped loop in a second horizontal plane displaced from said first horizontal plane which loop slidingly moves with respect to both of said another surfaces upon rotation of said plug.

2. The apparatus of claim 1 wherein at least one of said first cables is positioned adjacent another one of said first cables such that the loop of said one first cable is of smaller radius than the loop of said adjacent first cable and is contained within the horizontal area enclosed by the loop of said another first cable.

3. The apparatus of claim 2 wherein all of said cables have a circular cross-section and a substantially similar outside diameter and wherein the vertical spacing between consecutive horizontal surfaces is approximately 1½ times said cable diameter.

4. The apparatus of claim 2 wherein all of said cables have a substantially similar outside diameter and said preselected distance is less than said diameter.

5. The apparatus of claim 4 wherein during motion a portion of said first plurality of surfaces extends beyond said aligned second surfaces, and wherein said apparatus further comprises a vertically oriented guard laterally spaced from said extended first surfaces a preselected distance less than said diameter.

* * * * *